US012309201B2

(12) United States Patent
Ghosh

(10) Patent No.: US 12,309,201 B2
(45) Date of Patent: May 20, 2025

(54) DATA GOVERNANCE AND SECURITY FOR DIGITAL ASSESTS

(71) Applicant: International Business Machines Corporation, Armonk, NY (US)

(72) Inventor: Partho Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 17/656,226

(22) Filed: Mar. 24, 2022

(65) Prior Publication Data

US 2023/0328104 A1   Oct. 12, 2023

(51) Int. Cl.
*H04L 9/40*      (2022.01)
*H04W 4/021*     (2018.01)

(52) U.S. Cl.
CPC .......... *H04L 63/20* (2013.01); *H04L 63/1416* (2013.01); *H04W 4/021* (2013.01)

(58) Field of Classification Search
CPC ..... H04L 63/20; H04L 63/1416; H04W 4/021
See application file for complete search history.

(56) References Cited

U.S. PATENT DOCUMENTS

| | | | |
|---|---|---|---|
| 2011/0239269 A1* | 9/2011 | Wahl | H04L 63/0815 726/1 |
| 2015/0015571 A1* | 1/2015 | Yuda | G06T 15/005 345/419 |
| 2015/0141045 A1 | 5/2015 | Qiu | |
| 2017/0286572 A1 | 10/2017 | Hershey | |
| 2018/0137219 A1* | 5/2018 | Goldfarb | G06N 3/126 |
| 2019/0354922 A1 | 11/2019 | Berti | |
| 2020/0076835 A1* | 3/2020 | Ladnai | H04L 63/0263 |

(Continued)

OTHER PUBLICATIONS

"Geofencing—Location based MDM restriction", hexnode, Help Center, last printed Mar. 21, 2022, 5 pages, <https://www.hexnode.com/mobile-device-management/help/geofencing-location-based-mdm-restriction/>.

(Continued)

*Primary Examiner* — Alexander Lagor
*Assistant Examiner* — Taylor P Vu
(74) *Attorney, Agent, or Firm* — Joseph P. Curcuru

(57) ABSTRACT

In an approach to improve data governance and security for digital assets, embodiments apply, based on blockchain based smart contracts, privacy and security policies for a participating heterogeneous digital twin enclosed within predetermined boundaries of a geofence boundary, and apply, based on a hierarchical designation of geofences, hierarchical privacy and security policies to geofences associated with the participating digital twin. Further, embodiments dynamically generate computational and deployment policies based on the applied hierarchical privacy and security policies of the geofenced digital twin, and create dynamic test automation workflows for enhanced security and privacy testing that enumerate security, privacy vulnerabilities or high-risk geospatial areas. Moreover, embodiments generate a knowledge corpus comprising information security and information privacy control attribute profiles for the geofence and components of the geofence, and implement enhanced policy models for predicting an event to be a policy breach based on the generated knowledge corpus.

20 Claims, 4 Drawing Sheets

(56) References Cited

U.S. PATENT DOCUMENTS

| | | | |
|---|---|---|---|
| 2020/0250683 A1* | 8/2020 | Padmanabhan .. | G06Q 20/38215 |
| 2020/0283002 A1* | 9/2020 | Gupta .............. | G08G 1/096741 |
| 2021/0234900 A1* | 7/2021 | Francis ................. | H04M 15/66 |
| 2021/0273978 A1* | 9/2021 | Hadar ................... | G06F 21/577 |
| 2021/0327018 A1* | 10/2021 | Carranza ................ | H04L 67/10 |
| 2021/0351980 A1* | 11/2021 | Huffman ............. | H04L 63/1416 |
| 2022/0165438 A1* | 5/2022 | Marzorati .............. | G05B 13/04 |
| 2022/0237532 A1* | 7/2022 | Phadke .............. | G06Q 10/0637 |
| 2022/0239700 A1* | 7/2022 | Ping ........................ | H04L 63/20 |
| 2023/0056673 A1 | 2/2023 | Ghosh | |
| 2023/0195066 A1* | 6/2023 | Ramanasankaran ... | G05B 15/02 |
| | | | 700/28 |

OTHER PUBLICATIONS

"Geo-Fencing in Data Governance and It's Possible Uses", FileCloud Blog, Nov. 16, 2020, 6 pages, <https://www.getfilecloud.com/blog/2020/11/geo-fencing-in-data-governance-and-its-possible-uses/#.YQCgJOgzbIU>.

Becue, et al. ,"A New Concept of Digital Twin Supporting Optimization and Resilience of Factories of the Future", MDPI, Applied Sciences, 2020, 10 (13), 4482, 32 pages, <https://www.mdpi.com/2076-3417/10/13/4482/htm>.

Edward, "Tools.Valarm.net Calculators—Add Constant Values to IoT Sensor Reports", Valarm, blog, © 2019, 5 pages, <https://www.valarm.net/blog/calculators-add-constant-value-iot-sensor-report/>.

Hasan, et al., "A Blockchain-based Approach for the Creation of Digital Twins", IEEE Access, vol. 4, 2016, 13 pages, <https://www.researchgate.net/publication/339349234>.

Isbuzz Staff, "Delivering A Secure IoT Network To Exploit Digital Twins", Information Security Buzz, Nov. 21, 2019 , 5 pages, <https://informationsecuritybuzz.com/articles/delivering-a-secure-iot-network-to-exploit-digital-twins/>.

Javed, et al., "Enforcing Geofences for Managing Automated Transportation Risks in Production Sites", Dependable Computing—EDCC 2020 Workshops, Chapter, Aug. 2020, 13 pages, <https://www.researchgate.net/publication/343983431>.

Nicholl, Ali, "Getting to grips with digital twins", The Stack, Jun. 8, 2021, 5 pages, <https://thestack.technology/digital-wins-iotics/>.

Pultar, Edward, "Industrial IoT + Geofencing for Monitoring Mobile Assets with Sensors", Medium.com, Nov. 26, 2018, 4 pages, <https://medium.com/©edwardpultar/industrial-iot-geofencing-for-monitoring-mobile-assets-with-sensors-1e9e1424ae43>.

Zafari, et al., "Microlocation for Internet-of-Things-Equipped Smart Buildings", IEEE Internet of Things Journal, vol. 3, No. 1, Feb. 2016, pp. 96-112, <https://ieeexplore.ieee.org/document/7120085>.

"Automated Mobility District "Digital Twin" Provides Insights for Urban Transportation Systems," https://www.nrel.gov/news/program/2020/amd-digital-twin-provides-insight-for-urbantransportation-systems.html, Sep. 15, 2020, 3 pages.

Barrie et al., "IoT Security: Challenges and Solutions for Mining," ICC '17: Proceedings of the Second International Conference on Internet of things, Data and Cloud Computing, Mar. 2017, Article No. 38, pp. 1-9. https://doi.org/10.1145/3018896.3018933.

Maple, C., "Security and privacy in the internet of things," Journal of Cyber Policy, 2017, vol. 2, No. 2, pp. 155-184. https://www.tandfonline.com/doi/full/10.1080/23738871.2017.1366536.

Provenzano, L., "Creating Network Digital Twins," Scalable Network Technologies, Blog, Jun. 9, 2020, 5 pages. https://www.scalable-networks.com/creating-network-digital-twins/.

Qi et al., "Digital Twin and Big Data Towards Smart Manufacturing and Industry 4.0: 360 Degree Comparison," IEEE Access, vol. 6, 2018, pp. 3585-3593. https://ieeexplore.ieee.org/abstract/document/8258937/.

Qi, C., "Big data management in the mining industry," International Journal of Minerals, Metallurgy and Materials, vol. 27, pp. 131-139, (2020). https://link.springer.com/article/10.1007/s12613-019-1937-z.

Rytel et al., "Towards a Safer Internet of Things—A Survey of IoT Vulnerability Data Sources," Sensors, 2020, 20, 5969, pp. 1-26. https://www.mdpi.com/1424-8220/20/21/5969.

Mao, C., "Privacy Issues in IoT: ," Degree project in Informatics at Master Level, Year 2019, 50 pages. https://www.diva-portal.org/smash/get/diva2:1379227/FULL TEXT01.pdf.

* cited by examiner

DATA GOVERNANCE AND SECURITY FOR DIGITAL ASSESTS

BACKGROUND OF THE INVENTION

The present invention relates generally to the field of digital asset security and management, and more particularly to data governance and security involving geofenced based digital twin ecosystems or networks.

A geofence is a virtual perimeter for a real-world positioning area. A geofence could be dynamically generated—as in a radius around a point location or object or asset, or a geo-fence can be a predefined set of boundaries (such as school zones or neighborhood boundaries). The use of a geofence is called geofencing, and one example of use involves a location-aware device of a location-based service (LBS) user entering or exiting a geo-fence. The location-aware device and LBS activity could trigger an alert to the device's user and/or the geo-fence operator if there is a breach in the geofence or if a predetermined action is recognized. The information that is contains the location of the device, could be sent to a mobile telephone or an email account (i.e., any computing device known in the art).

The rapid advancements in computing, storage, communications, and networking technologies have enabled the creation of Digital Twins (DTs). A DT is a digital representation of a real-world physical component, product, or equipment. DTs can mainly be classified into two categories, namely, static and dynamic DTs. The former type of digitized models neither change in shape nor affected by data streams. However, the latter type of DTs keeps changing based on the updated streams of data. DTs capture live performances of the real objects and continuously stay updated. DTs may also be altered instantaneously.

SUMMARY

Embodiments of the present invention disclose a computer-implemented method, a computer program product, and a system for digital asset data governance and security, the computer-implemented method comprising: applying, based on blockchain based smart contracts, privacy and security policies for a participating heterogeneous digital twin enclosed within predetermined boundaries of a geofence boundary; applying, based on a hierarchical designation of geofences and a participating digital twin that are multi-layered or comprises overlapping geofenced digital twin ecosystems, hierarchical privacy and security policies to geofences associated with the participating digital twin; dynamically generating computational and deployment policies based on the applied hierarchical privacy and security policies of the geofenced digital twin; creating dynamic test automation workflows for enhanced security and privacy testing that enumerate security, privacy vulnerabilities or high-risk geospatial areas; generating a knowledge corpus comprising information security and information privacy control attribute profiles for the geofence and components of the geofence; and implementing enhanced policy models for predicting an event to be a policy breach based on the generated knowledge corpus.

DETAILED DESCRIPTION

Figure 1A:
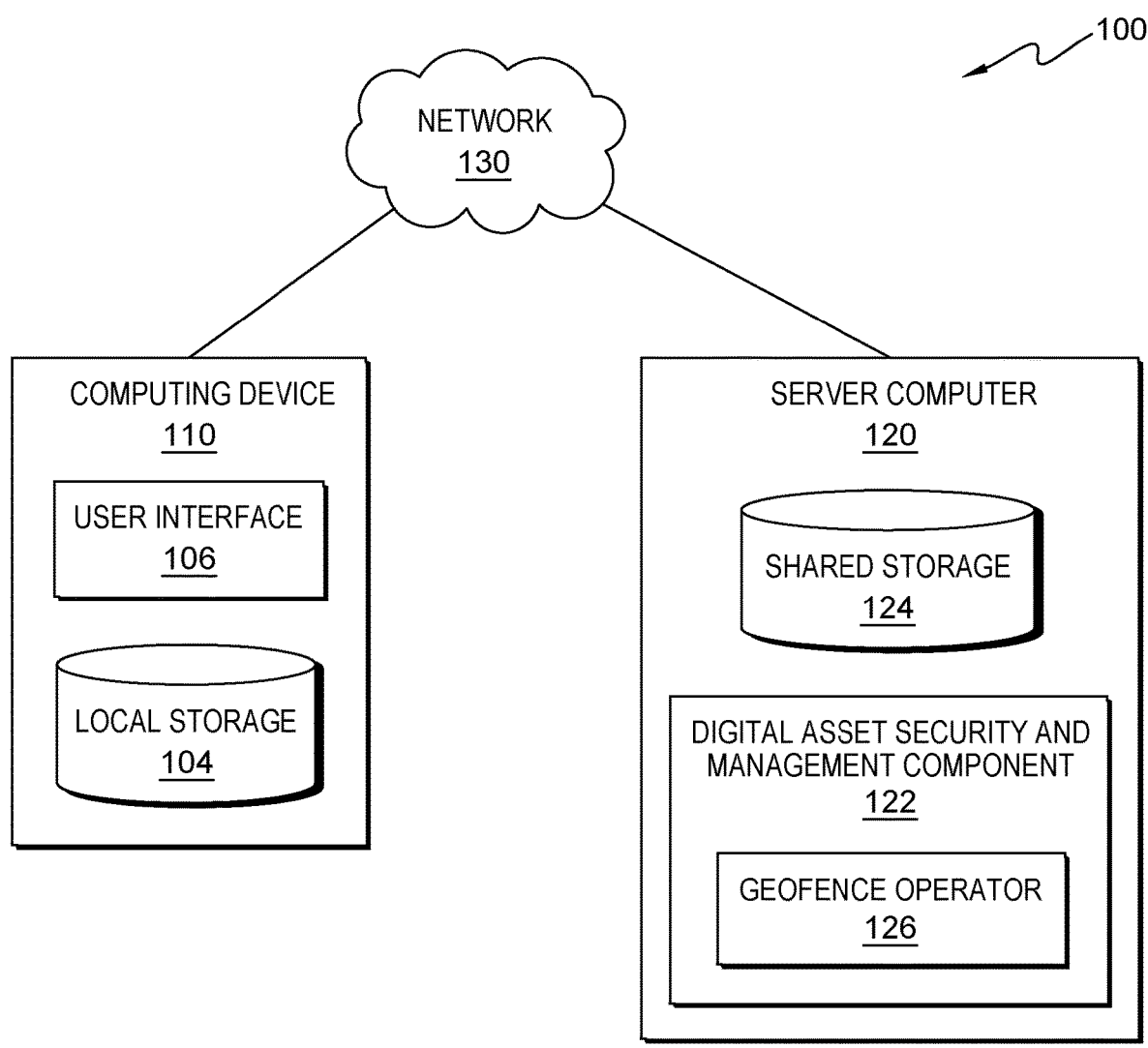
FIG. 1A is a functional block diagram illustrating a distributed data processing environment, in accordance with an embodiment of the present invention.

Embodiments of the present invention recognize that digital twins (i.e., digital assets) are virtual replicas of real-world living or non-living assets, dynamic simulations of physical behavior in facets ranging from a single tire to a whole factory. Further, embodiments of the present invention recognize that digital twins are the link between the real world and cyberspace which has been exploited with the advancement of internet of things (IoT) and information and communication technology (ICT) devices. Digital twins are the virtual replica of a physical or non-physical system across its life cycle to understand real time data for analysis, reasoning and understanding. Embodiments of the present invention recognize that a digital twin model typically describes the characteristics, attributes, and behavior of an entity type wherein an entity includes physical assets, non-physical assets, dynamic assets, static assets, processes, and systems. Embodiments of the present invention recognize that data in a digital twin usually doesn't come from a single source, and that it is important to understand that a digital twin is not a single massive data lake that contains all the information about an entity. Moreover, embodiments of the present invention recognize that the model is not the digital twin, and that the model is a description of characteristics, attributes, and behaviors that define what a digital twin's structure looks like, but the twin is the unique instance for a specific entity.

A discrete Digital Twin is the lowest level of abstraction that is still sufficient to meet the requirements of a specific use case. It is often a single or atomic entity where it adds no value to break it down. A composite Digital Twin is a combination of discrete Digital Twins that represent an entity comprised of multiple individual components or parts. A composite Digital Twin can be an Assembly Twin. A composite Digital Twin can be a System Twin that comprises multiple Assembly Twins such as the Processing and Refinement units.

Embodiments of the present invention recognize that the status of the digital twin is typically used for basic condition monitoring applications such as dashboards and simple alerting systems, wherein the status of the digital twin indicates operating parameters and is generally created with visualization tools. The operational twin Provides more extensive information that is typically used in decision support by operators, reliability engineers, and other decision-makers, wherein the operational twin is linked to a set of actions or workflows where users can interact with the twin and change operating parameters where control capability is allowed. Embodiments of the present invention recognize that the simulation twin leverages different types of simulations or artificial intelligence capabilities to predict, forecast, or provide insight into future operational states. Embodiments of the present invention may utilize the simulation twin for predictive maintenance or to improve the recovery yield of a processing plant.

While a digital twin begins its life as a model, embodiments of the present invention recognize that the digital twin becomes more powerful when it starts to receive real-time data from its real-world counterpart, and the digital twin simulation then becomes active, changing as the data are delivered. Because the digital twin dynamically changes based on data received from the real-world/physical counterpart (i.e., physical device), the digital twin matures through the product lifecycle. As a result, embodiments of the present invention recognize that the digital twin yields valuable information that is not generated by a traditional simulation—and that can drive business decisions. Embodiments of the present invention recognize that digital twin exchange platforms enable manufacturers, third party, digital content providers, and/or any open source platform can sell/exchange the digital resources related to a physical or non-physical assets to owners and operators. Digital twin computing represents a new computing paradigm that goes beyond physical reproduction of the real world by achieving interactive effects among digital twins including the inner state of humans/animals in cyberspace. Embodiments of the present invention recognize that digital twin computing configures a virtual society composed of a variety of digital twins, replicate in cyberspace digital twins of single entities in the real world, and exchange or fuse some of the elements constituting different digital twins to generate new digital twins that do not exist in the real world. Additionally, embodiments of the present invention recognize that that so-called conventional "siloed" digital twins are seamlessly linked rather than having mutual compatibility.

Additionally, embodiments of the present invention recognize that the network of digital twins synchronizes the virtual, physical, conditional, and commercial definitions of assets in real time to optimize operating performance conditions, predict service or repair requirements, improve diagnostics, and enhance decision-making through combined technical and business information. Embodiments of the present invention recognize that a geofence is a virtual perimeter for a real-world positioning area, and/or a virtual perimeter for a real-world geographic area. Additionally, embodiments of the present invention recognize that a geo-fence could be dynamically generated—as in a radius around a point location or object or asset, or a geo-fence can be a predefined set of boundaries (such as school zones or neighborhood boundaries). Further, embodiments of the present invention recognize that by establishing the geofence, the application, a user, or other entity can be notified when a computing device triggers the geofence (e.g., by entering a geofence, exiting a geofence, or dwelling in the geofence for a duration). Geofences can also be used for distributing or delivering content (e.g., advertisements, online content, content items, websites, online documents, articles, blogs, posts, images, video, audio, or multimedia content). Whether embodiments monitor industrial assets, pumps, tanks, chemicals, vehicles, sensors, or anything else known in the art, the established geofences alerts a user when anything is inside or outside the customized geofence zones.

Embodiments of the present invention recognize that although digital twin solutions are being implemented in a growing and fast way in almost all the aspects of humans' everyday life, their security and privacy exposition is not decreasing. The integration of real-world objects with the virtual twin (i.e., digital twin) poses several security/privacy challenges specifically, the nature of the digital twin ecosystem itself presents limitations from a security and privacy viewpoint. Further, embodiments of the present invention recognize that due to the different standards and different communication stacks involved, the resource constraints, and the massive amount and heterogeneity of interconnected devices, traditional security measures may not be employed efficiently in internet of things (IoT) systems. Additionally, embodiments of the present invention recognize that the large amounts of data exchanged among the smart objects in a geofenced region which makes it unfeasible for a human to appropriately deal with all the events generated. In this direction, embodiments of the present invention recognize that some proposals have been presented based on the management of security events generated by IoT devices.

Moreover, embodiments of the present invention recognize that it is difficult to manage data of an entire geofenced based digital twin ecosystem efficiently and securely from the perspectives of data storage, data access, data sharing, and data authenticity due to the complexity of the network. Further, embodiments of the present invention recognize that the digital twin ecosystem generated from geofenced boundaries of a geospatial region is continuously updated to the latest (i.e., newest) twin state on each of its payloads manipulations such as, but not limited to, exchange, converge, merge, split, and replication of participating twins based on actions like entering, splitting, and leaving the twins of geofence thereby re-writing the entire state that records the twin ecosystem.

Embodiments of the present invention recognize that issues with dynamic geofenced based digital twins comprise: (i) seamless secure connectivity between digital twins: they can greatly benefit from being securely connected to each other, leading to increased efficiency, shared insights, saved time and reduced costs, (ii) status, functional, and operational dependencies of one twin on another twin, (iii) adherence to security policies, access-control rights (complete, partial or null), and data exchange between one or more dependent twins, (iv) priority, hierarchical based data access and sharing notifications, (v) lack of secure data curation, data orchestration, data management and data oversight approaches to meet digital twin data governance and provenance between twins and/or between one/more twin and third party, (vi) lack of trusted network twins and/or twin of multiple twins, (vii) lack of security strategy model in a geofenced based digital twin ecosystem, (viii) digital twin ecosystem or individual twin access: if someone can gain access to your digital twin, they could not only get insights into the system or asset it replicates but also, more dangerously, get control of those physical assets. This can result in uncontrollable behaviors, (ix) intellectual property (IP) theft, non-compliance regarding privacy laws and regulations, and information integrity, (x) missing data standards and medium, and (xi) broken information flow across lifecycle phases and clarification of ownership information. In some embodiments, being that the digital twin can be a blueprint to intellectual property, IP theft represents an unauthorized third party access and ability to reverse engineer and reproduce that property, bypassing the need for research and development. Information integrity refers to information that can degrade (i.e., lose its integrity) when users are enabled to access and make unauthorized changes to a primary user's data (e.g., personal or secure data).

Embodiments of the present invention improve the art and solve one or more particular issues stated above by efficiently overcome the challenges of data management, security, sharing, priority and authentication for a digital twin ecosystem/network derived from geofenced geospatial region(s). Embodiments improve the art and solve at least a portion of the particular issues above by enabling seamless secure interaction and exchange of data and events-status/operational/monitoring between one or many digital twins in an ecosystem or network, and dynamically applying data governance, provenance and security guidelines and compliance for one or more digital twin in an ecosystem or network.

More specifically, embodiments improve the art and solve at least a portion of the particular issues above by (i) dynamically installing and applying, based on the geofenced location intelligence and blockchain based smart contracts, the security, privacy policies and privileges for the all the participating heterogeneous digital twins enclosed within boundaries of multifarious types of geofences like static, dynamic, time-based and conditional geofences, (ii) enabling based on hierarchical designation of geofences and their participating twins in a multi-layered or overlapping geofenced digital twin ecosystem, multilevel security and privacy by installing and applying hierarchical privacy and security policies that filter, de-identification of personal information and sensitive information, prioritize data, models, status, operational notifications and events based on the hierarchical levels, (iii) using smart contracts defined by the installed security and privacy policies in a multi-layered geofenced digital twin ecosystem and/or network, embodiments of the present invention enable confidential, integral, secure, governed and provenanced data exchange between all the interacting twins for multifarious twin dependencies like operational, status, procedural, simulation and predictive and integrity of the physical devices corresponding to the discrete or composite twins, (iv) using smart contract based twin management framework, embodiments of the present invention monitor and authenticate whether any twin payload entering or leaving the geofenced area is hacked or tampered with; thereby authorize or restrict malicious data exchanges between twins during dynamic twin payload interactions like exchange, converge, merge, split, replicate for events like a twin entering a geofenced area thus merging with the twin ecosystem, and/or any other payload interactions known and used in the art, wherein embodiments of the present invention auto-notifies and reports the malicious physical device and its twin to the ecosystem administrators and security teams (i.e., primary user(s)), (v) identifying and tracking, based on the installed single and/or multi firmware privacy policies, the situation of the physical device and checking for data compliance violations if any, wherein data compliance violations are data containing personal or sensitive personal information thereby enabling complete, partial or no authorization of data exchange from dynamic twin payload interactions mentioned above, (vi) creating dynamic test automation or intelligent workflows for enhanced security and privacy testing like but not limited to threats, security assessment, privacy assessment, policy simulation, physical devices, data access, and/or time of access, that enumerate security, privacy vulnerabilities or the high-risk geospatial areas, and corresponding physical devices and twins requiring in-depth protection or policy up-gradation, and/or (vii) generating a corpus of information security and information privacy control attribute profiles for each corresponding geofence and its components like twins, models, incidents, breaches, non-compliance, physical device data, investigations, and updates which dictate the level of security and privacy attributes that should accompany each geofencing policy. Additionally, embodiments of the present invention improve the art and solve the particular issues stated above by further using artificial intelligence (AI) on the historical metrics data, embodiments of the present invention generate insights, classify incidents and hence provide enhanced policy models for predicting an event to be a policy breach. A physical device/asset is any static or moveable connected device, that is known and understood in the art, capable of emitting, receiving and/or exchanging data in a geofenced system such as, but not limited to vehicles, machinery, computers, and smart devices.

Implementation of embodiments of the invention may take a variety of forms, and exemplary implementation details are discussed subsequently with reference to the Figures (i.e., FIG. 1A-FIG. 3).

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to digital asset security and management component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 3. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 3. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In the depicted embodiment, component 122 comprises geofence operator 126.

Geofence operator (operator) 126 is used to manage user-defined geographical regions called geofences and provide information as entities move in and out of these regions. In various embodiments, geofences within operator 126 are uniquely identified by a user-supplied fence identification number (ID) and a polygon defined as a string, while an entity can be any object in motion. An entity is defined by its unique id and its location. If a fence's polygon fully contains the location that is associated an entity, the entity is said to be present in the fence. This statement is true even if the entity's location is a polygon and not a simple point. The entity's location can be a pair of latitude and longitude coordinates or a geometry. Geofence are locational perimeters along with a set of policies that guides the devices operating in the geofence perimeter with regard to data exchange or events (e.g., authentication events) when a device enters or leaves a fence.

In various embodiments, operator 126 has two different forms of output, events output and membership output. By default, operator 126 may produce a list of all the fences that an entity is currently contained in and output the produced list, via interface 106. This behavior is called membership mode. In events mode, operator 126 still produces the list of the fences an entity is in, but also produces a list of fences it has entered or exited. An entity exits a geofence when an entity was previously contained in the fence but the most recent update to the entity's location is no longer within the geofence parameters. Similarly, an entity enters a geofence when the entity's previously location was registered outside the geofence, and the entity's most recent location indicates the entity is now within the geofence. Further, configuring operator 126 in membership mode may provide a performance improvement.

In various embodiments of the present invention, not depicted in FIG. 1A, knowledge corpus may each execute on a plurality of server computers 120 and/or on a plurality of computing devices 110. In some embodiments, knowledge corpus may be located and/or executed anywhere within distributed data processing environment 100 if the knowledge corpus is connected to and/or communicates with, computing device 110, component 122, and/or server computer 120, via network 130.

In various embodiments, component 122 creates a digital twin ecosystem of the physical and non-physical assets in the geospatial region based on the geofenced perimeter of the geospatial region. In various embodiments the geofenced perimeter and the geospatial region may each be predetermined or customized by one or more users (e.g., a primary user). Component 122 may enable the one or more assigned geofences to comprise one or more associated security and privacy policies, wherein the deployed devices (e.g., physical device/computing device 110) and digital twins may be mandatorily compliant to the security and privacy policies of the assigned geofence. Thus, in various embodiments, geofence security policies may be inherited by participating and interacting digital twins. In various embodiments, by assigning and/or outputting instructions to assign geofences, deployed physical devices can be ensured to be non-operational outside of the designated geo-fence. Component 122 may apply multiple or multi-level geofences to a geospatial region, wherein each multiple or multi-level geofences consists of one or more heterogeneous security policies. Further, component 122 may apply multiple or multi-level geofences consisting of one or more heterogeneous privacy policies to one or more geospatial region. The geofence security or privacy policy compliance may be based on the hierarchical designation of geofences.

In various embodiments, the participating twins must comply with the security and privacy policies applied in hierarchical manner for one or more interactions involving sharing or acceptance of data, events and twin models. Any sharing of data may adhere to encryption based on smart contracts, these encryption keys or codes may be defined by the policies installed in the corresponding geofence/s to which the physical device and its twin belongs to. Thus, component 122 may ensure any data sharing adheres to an encryption based on smart contracts by storing and applying the encryption keys or codes defined by the policies installed in the corresponding geofence. Additionally, component 122 may ensure any physical device interaction and the physical device twin data (e.g., updating digital twin data to reflect identified physical device interaction, data access, physical device access, firmware and firewall updates, and/or physical device controls) adheres to predetermined and/or preinstalled policies and thereby corresponding authentication and authorization.

Smart contracts based geofenced twins may provide IoT data, that falls into Personally Identifiable Information (PII) data, with traceability and provenance. Component 122 may comprise a physical device management framework that manages one or more dynamic twins within a geofenced spatial area, wherein the physical device management framework may manage one or more dynamic digital twins with a geofence spatial area-based activities (e.g., exchange, converge, merge, split, replicate and synthesize twin payloads) and twin events (e.g., entering or leaving a geofenced area. digital twins are mainly be classified into two categories, namely, static and dynamic digital twins. Static digital twins are digitized models that neither change in shape nor affected by data streams. Conversely, dynamic digital twins continuously update/change based on the updated streams of data from the physical twin (i.e., dynamic digital twins capture live performances of the real objects). Thus, dynamic digital twins continuously stay updated and can be altered instantaneously. For example, in heavy machinery equipment, a pick-up truck and a trolly on a worksite would each comprise a static digital twin; however, when they are merged into a truck-trolley the new physical device will comprise a dynamic digital twin.

Further, in various embodiments, new physical devices entering the geofence may mandatorily need to comply with the established polices. Component 122 can ensure compliance by adhering to the physical device dynamic twin payload interactions like exchange, converge, merge, split, and/or replicate for events like a twin entering a geofenced area thus merging the new physical device with the twin ecosystem. In various embodiments, geofencing is a form of location intelligence that uses mobile global positioning system (GPS) or Radio Frequency Identification (RFID) to generate a targeted marketing action like a text, email, social media advertisement, or app notification when a consumer's mobile device or RFID tags crosses the established geofencing. Component 122 may enable users to deliver digital advertisements and content attuned to a target user's (e.g., consumers') behavior and demands.

An information compliance event identifies the occurrence of a system, service or network state indicating a possible breach of information security or privacy policy or failure of controls or a previously unknown situation that may be security or privacy relevant. In various embodiments, component 122 enables and/or executes simulations in a compliance event management (CEM) system which may enable real-time monitoring, reporting, normalization, correlation, and aggregation of breach events allowing log management and reporting. Therefore, the simulations may support AI based threat detection and incident response through the real-time collection and historical correlation and analysis of security and privacy events, compliance reporting and incident investigation through analysis of historical data from these sources. In various embodiments, based on the compliancy of security policies associated with the geofence, component 122 enables a risk management framework, wherein, the risk management framework is implemented as a source decision to manage the compliancy and danger of a physical device/s entering and leaving a specified geographic area and notify a user of any identified danger and/or of physical devices entering or leaving the geofence. Component 122 may enable a data governance and provenance management framework based on the compliancy of privacy policies associated with relevant geofences(s), wherein component uses the data governance and provenance management framework as a source of data collection and/or data collection regulation. Further data collection regulations are often implemented to notify and manage the compliancy of exchange of data, events between one or more physical devices inside the geofence, or exchange of data to a third party like administrators or owners. The geofenced based policies may adhere to complying data that falls into PII that is regulated under privacy laws governed by the geofence.

Component 122, based on hierarchy and filter data, may rank and output notifications and status updates for a geofenced digital twin and/or plurality of geofenced twins involved in a geospatial region based on the privacy and security policies and hierarchy of the geofence, wherein the privacy and security policies and hierarchy of the geofence are predetermined and/or customized by one or more users (e.g., administrators). In some embodiments, component 122 displays the output notifications and status updates via interface 106 on computing device 110. In various embodiments, component 122 comprises administrators that are authenticated in the network by using digital signatures, wherein the digital signatures are predetermined or customizable. Administrators (i.e., users/primary users) modify the configuration/policy by implementing updates and policy patches of devices within the blockchain. Component 122 may create a blockchain smart contract based on a preselected or customized ecosystem to ensure secure and trusted traceability, accessibility, and immutability of transactions, logs, and data provenance. In various embodiments, component 122 utilizes smart contracts to govern and track transactions initiated by participants or physical devices involved in the geofenced digital twin.

Triggering the two overlapping digital twins may affect data and notifications tied simulation, modeling hence component 122 may enable hierarchical designation of digital twins wherein if the second digital twin is active, that may take the precedence and when inactive, the first twin may take the precedence of simulating data, and broadcasting notifications. Blockchain ensures provenance data tracking and tracing on-chain and provides other features that include trust, accountability, data integrity, and immutability which make it an ideal solution to monitor the creation process of digital twins. In various embodiments, component 122 may comprise and execute a blockchain. In other embodiments, component 122 may execute on a blockchain. The blockchain enables the exchange of timestamped events and notifications which are permanently stored in a secure and tamper-proof ledger. Component 122 enables security as an embedded enabler of innovation using encryption, authentication, and threat detection technologies, with security policies in place to create and ensure digital trust. Digital trust builds on security, policy and risk management to provide the confidence required for employees, partners and customers to work with an enterprise at digital speed and scale.

In various embodiments, component 122 considers two modes of operation of the geofence digital twin ecosystem (e.g., (i) monitoring mode and (ii) replication mode). In monitoring mode, component 122 operates independently of the physical environment, offering the possibility to monitor and explore the digital twin ecosystem (e.g., security and safety rules stated as part of the specification can be automatically monitored on the basis of digital twins). In a replication mode, component 122 replays, via one or more visual outputs (e.g., video, diagram depiction, and/or any virtual representation known in the art), one or more events from the physical environment for visualization and analysis. Additionally, in replication mode, multiple security and privacy features may be established. For example, new physical devices can be connected and tested in the virtual environment, without influencing production systems. Security testers also have the possibility to freely explore and attack a virtual replication of the production setup. With this approach, security policies can be seamlessly integrated into a production lifecycle, starting from the engineering phase.

Figure 1B:
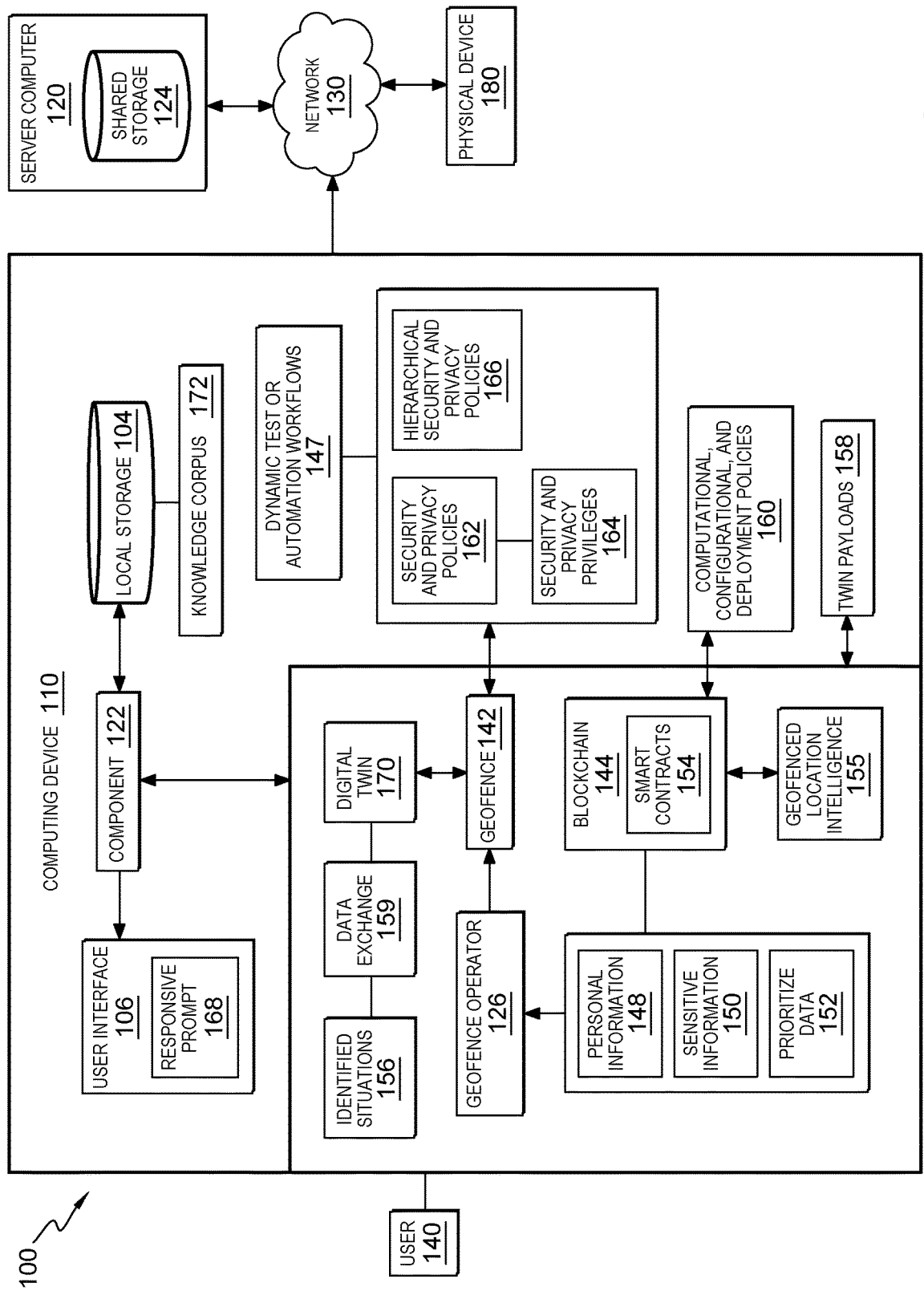
FIG. 1B is a functional block diagram illustrating a distributed data processing environment of a digital asset security and management component, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, user 140, physical device 180, and server computer 120 interconnected over network 130.

In the depicted embodiment, In the depicted embodiment, based on the geofenced location intelligence 155 and blockchain based smart contracts (smart contracts 154 on blockchain 144), component 122 dynamically installs and applies; security and privacy policies 162 and security and privacy privileges 164 for participating heterogenous digital twins (i.e., digital twin 170) enclosed within boundaries of multifarious types of geofences like static, dynamic, time-based, and conditional geofences (i.e., geofence 142). In various embodiments, based on hierarchical designation of geofences 142 and geofences 142 participating twins (digital twins 170) in a multilayered or overlapping geofenced digital twin ecosystem, component 122 enables multilevel security and privacy policies 162 and security and privacy privileges 164 by installing and applying hierarchical privacy and security policies 166 that filter, de-identification of personal information 148, sensitive information 150, and prioritize data 152 (e.g., prioritized data, models, status, operational notifications and events) based on the hierarchical levels from hierarchical privacy and security policies 166. A single connected device (i.e., physical device/component 110) may represent a discrete or traditional digital twin whereas an entire digital twin ecosystem may comprise of multifarious connected physical devices operating and synchronizing in a seamless manner. For example, a smart car would be leveraged as a single digital twin whereas an entire smart city could be leveraged as a digital twin ecosystem comprising of connected cars, connected roads, smart piping, smart drainage, digital electrical networks, and transportation networks.

In the depicted embodiment, component 122 dynamically generates computational, configurational and deployment policies 160 based on security and privacy policies 162 of geofenced twins 170, wherein one or more participating twins (e.g. digital twin 170) or physical devices (e.g., physical devices 180) complies with implemented policies for interactions or data sharing and exchange, and wherein the generated policies may define the amount, data origin, format of any incoming and outgoing data from physical device's 180 to ecosystem and vice versa. In various embodiments, the implemented policies for interactions or data sharing and exchange are predetermined and/or based on security and privacy policies 162, security and privacy privileges 164, and/or hierarchical privacy and security policies 166. Further, in the depicted embodiment, component 122 uses smart contracts 154 defined by the installed security and privacy policies 162 in a multilayered geofenced digital twin ecosystem and/or network, to enable confidential, integral, secure, governed and provenanced data exchange (i.e., data exchange 159) between interacting digital twins 170 for multifarious twin dependencies like operational, status, procedural, simulation and predictive and integrity of the physical devices corresponding to the discrete or composite twins. Geofences may be layered and overlapping with hierarchical designations, hence any like an ABC region falling under (ex: x, y, z overlapped fence)

with hierarchies (x>y>2), wherein each geofence has its policies, the devices and digital twin operating under ABC ecosystem may be governed by the applicable policies based on hierarchy and overlaps.

Additionally, in the depicted embodiment, using smart contract based twin management framework (i.e., smart contracts 154) and/or geofence operator 126, component 122 monitors and authenticates whether twin payloads 158 entering or leaving geofenced 142 is hacked or tampered with; thereby authorize or restrict malicious data exchanges between twins during dynamic twin payload interactions like exchange, converge, merge, split, replicate for events like a twin entering a geofenced area thus merging with the twin ecosystem. Component 122 may further auto-notify and report the malicious physical device(s) 180 and the reported malicious physical devices twin to the ecosystem administrators and security teams. In the depicted embodiment, based on the installed single and/or multi firmware privacy policies, component 122 will be able identify and track the situation of the device (i.e., identified situations 156) and check for data compliance violations if any; wherein data compliance violations are data containing personal or sensitive personal information thereby enabling complete, partial or no authorization of data exchange from dynamic twin payload interactions mentioned above. Firmware is a type of software that is etched directly into a piece of hardware. Firmware operates without going through APIs, the operating system, or device drivers-providing the needed instructions and guidance for the device to communicate with other devices or perform a set of basic tasks and functions as intended.

In the depicted embodiment, component 122 creates dynamic test automation or intelligent workflows 147 for enhanced security and privacy testing like but not limited to threats, security assessment, privacy assessment, policy simulation, devices, data access, and time of access, that enumerate security, privacy vulnerabilities or the high-risk geospatial areas, their corresponding devices and twins requiring in-depth protection or policy up-gradation. In the depicted embodiment, component 122 generates knowledge corpus 172, wherein knowledge corpus 172 comprises information security and information privacy control attribute profiles for each corresponding geofence and its components like twins, models, incidents, breaches, non-compliance, device data, investigations, and updates which dictates the level of security and privacy attributes that accompany each geofencing policy. Further, in embodiments not depicted in FIG. 1B, using AI on the historical metrics data, component 122 generates insights, classify incidents and hence provide enhanced policy models for predicting an event to be a policy breach.

Figure 2:
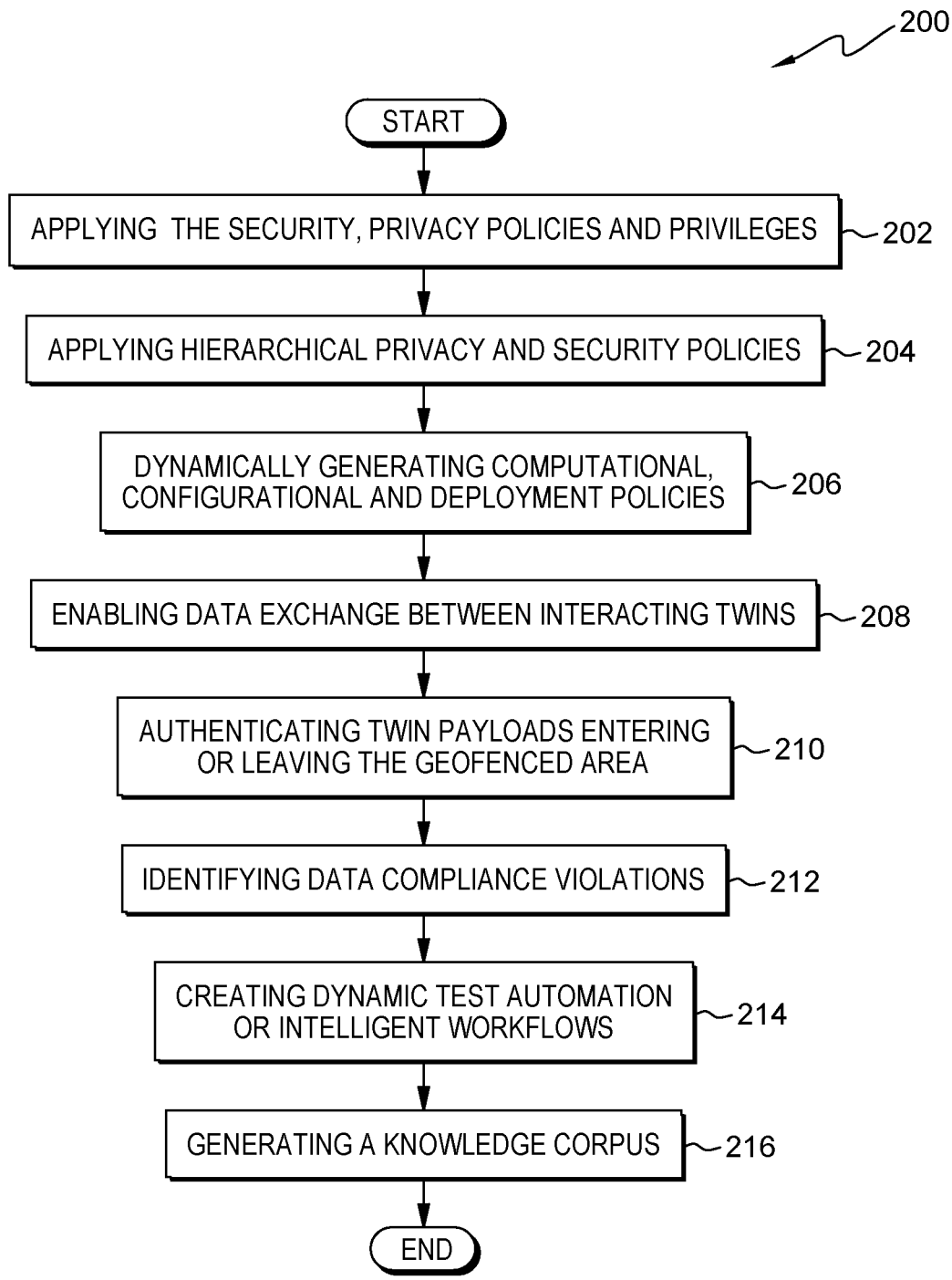
FIG. 2 illustrates operational steps of the digital asset security and management component, on a server computer within the distributed data processing environment of FIGS. 1A-1B, for data governance and security for digital assets, in accordance with an embodiment of the present invention.

FIG. 2 illustrates operational steps of component 122, generally designated 200, in communication with server computer 120, within distributed data processing environment 100 of FIG. 1A and/or FIG. 1B, for data governance and security for digital assets (e.g., digital twin), in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 applies security and privacy policies and privileges. In various embodiments, based on the geofenced location intelligence and blockchain based smart contracts, as they are known and understood in the art, component 122 dynamically installs and applies one or more security policies, privacy policies and/or privileges polices for one or more participating heterogeneous digital twins enclosed within boundaries of multifarious types of geofences (e.g., static, dynamic, time-based, and conditional geofences). Geofencing and location intelligence technology enable user to understand their customer behavior, engage them and provide personalized experiences to their customers.

In step 204, component 122 applies hierarchical privacy and security policies to geofences associated with one or more digital twins. In various embodiments, based on hierarchical designation of geofences and the participating digital twins that are multilayered or overlapping geofenced digital twin ecosystems, component 122 enables multilevel security and privacy by installing and applying hierarchical privacy and security policies that filter data, de-identify personal information and sensitive information, and prioritize data (e.g., prioritize models, status, and operational notifications and operational events based on the hierarchical levels).

In step 206, component 122 generates computational, configurational, and deployment policies. In various embodiments, component 122 dynamically generates computational, configurational and deployment policies based on the applicable security and privacy policies of a geofenced twin wherein any participating twin or physical devices may thereby comply on the applicable policies for interactions or data sharing and exchange, wherein the generated policies may define the amount, data origin, format of any incoming and outgoing data from device to ecosystem and vice versa.

In step 208, component 122 enables data exchange between interacting twins. In various embodiments, component 122, using smart contracts defined by the installed security and privacy policies in a multilayered geofenced digital twin ecosystem and/or network 130, enables confidential, integral, secure, governed and provenanced data exchange between all the interacting twins for multifarious twin dependencies like operational, status, procedural, simulation and predictive and integrity of the physical devices corresponding to the discrete or composite twins.

In step 210, component 122 authenticates twin payloads entering or leaving the geofenced area. In various embodiments, component 122, using smart contract-based twin management framework, monitors twin payloads entering or leaving the geofenced area, wherein component determines whether the monitored (e.g., identified) twin payloads entering or leaving the geofenced area are tampered with or compromised (e.g., hacked, have security breaches, and/or are vulnerable to cyber-attacks). Component 122 may authenticate twin payloads that have not been identified as a threat or compromised and reject or terminate payloads that have been identified as a threat or that have been compromised. In various embodiments, component 122 may generate and display a responsive prompt, via interface 106, to a user, where the displayed prompt is a response prompt that notifies the user of the status of payload and/or prompts the user to confirm the action of terminating the identified payload. In various embodiments, component 122 authenticates one or more twin payloads entering or leaving the geofenced area as being cleared of security threats or compromises (e.g., hacked or tampered data); and thereby authorize or restrict malicious data exchanges between twins during dynamic twin payload interactions (e.g., exchange, converge, merge, split, replicate for events like a twin entering a geofenced area thus merging with the twin ecosystem). Component 122 may auto-notify and report a malicious physical device and its twin to the ecosystem administrators and security teams, if a security threat or breach has been identified.

In step 212, component 122 identifies data compliance violations. In various embodiments, based on the installed single and/or multi firmware privacy policies, component 122 identifies and/or tracks the situation of the physical device and determines, based on the identified situation of the physical device, whether data compliance violations are present in the identified physical device situations, wherein data compliance violations are data containing personal or sensitive personal information thereby enabling complete, partial or no authorization of data exchange from dynamic twin payload interactions mentioned in step 208. The term situation here refers to a condition or context in which the physical device is operating, and the context determines whether the emitted/exchanged data is personal information or other information (e.g., general data), and/or what type of data is permitted to be exchanged. For example, in a region ABC which is a high secure region, only authenticated devices are allowed to emit/exchange data whereas if any devices start exchanging information with an un-authenticated device, then component 122 would consider/identify this exchange as a violation. In this example, the context here would be only authenticated devices allowed.

In step 214, component 122 creates dynamic test automation or intelligent workflows. In various embodiments, component 122 creates dynamic test automation or intelligent workflows for enhanced security and privacy testing, (e.g., security assessment, privacy assessment, policy simulation, physical devices, data access, time of access, and/or other security and privacy testing known in the art), that enumerate security, privacy vulnerabilities or the high-risk geospatial areas, their corresponding physical devices and twins requiring in-depth protection or policy up-gradation.

In step 216, component 122 generates a knowledge corpus (e.g., knowledge corpus 172). In various embodiments, component 122 generates a knowledge corpus comprising information security and information privacy control attribute profiles for each corresponding geofence and its components (e.g., twins, models, incidents, breaches, non-compliance, physical device data, investigations, and updates) that could dictate the level of security and privacy attributes that should accompany each geofencing policy. Further using artificial intelligence (AI) on the historical metrics data, component 122 generates insights, classifies incidents, and implements enhanced policy models for predicting an event to be a policy breach based on the generated knowledge corpus. Policy models are AI enabled security or privacy models based on learning of historical data or breaches, vulnerability or PII and/or data violations. AI may spot cyber threats and possibly malicious activities or data violations. Using ML techniques, AI systems may be trained to detect malware, run pattern recognition, and detect even the minutest behaviors of malware or ransomware attacks before it enters the system. AI enables superior predictive intelligence with natural language processing which curates' data on its own by scraping through articles, news, and studies on cyber threats. This predictive intelligence can give intelligence of new anomalies, cyberattacks, and prevention strategies.

In various embodiments, component 122 implements the generated knowledge corpus and/or insights, and/or classified incidents to update security and policy measures. Component 122 overcomes the challenges of data management, security, sharing, priority and authentication for a digital twin ecosystem/network derived from geofenced geospatial region/s, wherein based on the hierarchy and overlaps of one and/or many geofences of a region ABC, policies are generated which govern the data, privacy and security aspects of a devices and its digital twins operating inside the geofenced region, and wherein physical devices can emit/exchange data within themselves and devices could also emit/receive data from a remote centralized data store.

Figure 3:
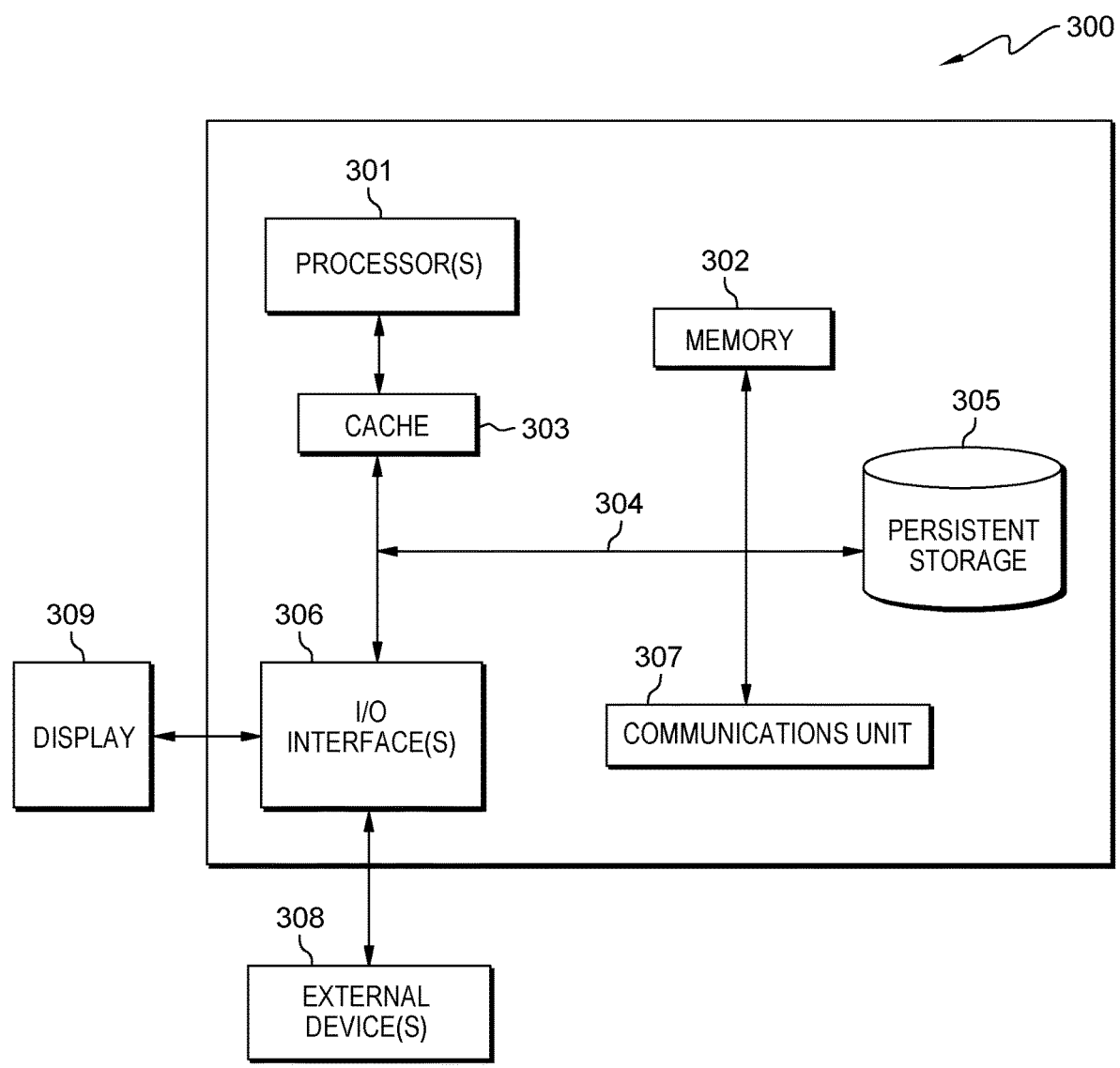
FIG. 3 depicts a block diagram of components of the server computer executing the digital asset security and management component within the distributed data processing environment of FIGS. 1A-1B, in accordance with an embodiment of the present invention.

FIG. 3 depicts a block diagram of components of server computer 120 within distributed data processing environment 100 of FIG. 1A and/or FIG. 1B, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 depicts computer system 300, where server computing 120 represents an example of computer system 300 that includes component 122. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 may be implemented with any architecture designed for passing data and/or control information between processors (such as microprocessors, communications, and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 enables for input and output of data with other devices that may be connected to each computer system. For example, I/O interface 306 may provide a connection to external devices 308 such as a keyboard, keypad, a touch screen, and/or some other suitable input device. External devices 308 may also include portable computer readable storage media such as, for example, thumb drives, portable optical or magnetic disks, and memory cards. Software and data used to practice embodiments of the present invention may be stored on such portable computer readable storage media and may be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for data governance and security of digital assets, the computer-implemented method comprising:

responsive to triggering two or more overlapping digital twins, enabling a hierarchical designation of the two or more digital twins, wherein responsive to a second digital twin being active, the second digital twin takes precedence over a first digital twin;

applying, based on blockchain based smart contracts, privacy and security policies for a participating heterogeneous digital twin enclosed within predetermined boundaries of a geofence, and applying multiple or multi-level geofences consisting of one or more heterogeneous privacy policies to one or more geospatial region;

applying, based on hierarchical designation of geofences and a participating digital twin from the two or more overlapping digital twins that comprises overlapping geofenced digital twin ecosystems, hierarchical privacy and security policies to geofences associated with the participating digital twin;

dynamically generating computational and deployment policies based on the applied hierarchical privacy and security policies of the geofenced digital twin;

creating dynamic test automation workflows for enhanced security and privacy testing that enumerate security, privacy vulnerabilities or high-risk geospatial areas; and generating a knowledge corpus comprising information security and information privacy control attribute profiles for the geofence and components of the geofence.

2. The computer-implemented method of claim 1, further comprising:

enabling, through smart contracts, confidential, integral, secure, governed and provenanced data exchange between the interacting digital twins for multifarious twin dependencies like operational, status, procedural, simulation and predictive and integrity of a physical devices corresponding to the discrete or composite digital twins.

3. The computer-implemented method of claim 1, further comprising:

monitoring, through smart contract-based twin management framework, digital twin payloads entering or leaving the geofenced area;

determining the monitored digital twin payloads entering or leaving the geofenced area are not tampered with or compromised; and authenticating the digital twin payloads that have not been identified as a threat.

4. The computer-implemented method of claim 1, further comprising:

identifying data compliance violations, based on installed single or multi firmware privacy policies, a situation of a physical device; and determining, based on an identified situation of the physical device, whether data compliance violations are present in the identified physical device situation, wherein the data compliance violations are data containing personal or sensitive personal information thereby enabling complete, partial or no authorization of data exchange from dynamic twin payload interactions.

5. The computer-implemented method of claim 1, wherein the security information and information privacy control attribute profiles dictate the level of security and privacy attributes that will accompany the geofencing policy.

6. The computer-implemented method of claim 5, further comprising:

generating insights, classifying physical device incidents, and implements enhanced policy models for predicting the event to be the policy breach based on the generated knowledge corpus.

7. The computer-implemented method of claim 1, further comprising:

displaying, by a user interface, a responsive prompt to a user, where the responsive prompt is a response prompt that notifies the user of a status of a digital twin payload and prompts the user to confirm a predetermined action based on an identified status of the digital twin payload.

8. A computer system for data governance and security of digital assets, the computer system comprising:

one or more computer processors;

one or more computer readable storage devices;

program instructions stored on the one or more computer readable storage devices for execution by at least one of the one or more computer processors, the stored program instructions comprising:

responsive to triggering two or more overlapping digital twins, program instructions to enable a hierarchical designation of the two or more digital twins, wherein responsive to a second digital twin being active, the second digital twin takes precedence over a first digital twin;

program instructions to apply, based on blockchain based smart contracts, privacy and security policies for a participating heterogeneous digital twin enclosed within predetermined boundaries of a geofence, and applying multiple or multi-level geofences consisting of one or more heterogeneous privacy policies to one or more geospatial regions;

program instructions to apply, based on hierarchical designation of geofences and a participating digital twin from the two or more overlapping digital twins that comprises overlapping geofenced digital twin ecosystems, hierarchical privacy and security policies to geofences associated with the participating digital twin;

program instructions to dynamically generate computational and deployment policies based on the applied hierarchical privacy and security policies of the geofenced digital twin;

program instructions to create dynamic test automation workflows for enhanced security and privacy testing that enumerate security, privacy vulnerabilities or high-risk geospatial areas;

program instructions to generate a knowledge corpus comprising information security and information privacy control attribute profiles for the geofence and components of the geofence; and program instructions to implement enhanced policy models for predicting an event to be a policy breach based on the generated knowledge corpus.

9. The computer system of claim 8, further comprising:
program instructions to enable, through smart contracts, confidential, integral, secure, governed and provenanced data exchange between the interacting digital twins for multifarious twin dependencies like operational, status, procedural, simulation and predictive and integrity of a physical devices corresponding to the discrete or composite digital twins.

10. The computer system of claim 8, further comprising:
program instructions to monitor, through smart contract-based twin management framework, digital twin payloads entering or leaving the geofenced area;
program instructions to determine the monitored digital twin payloads entering or leaving the geofenced area are not tampered with or compromised; and
program instructions to authenticate the digital twin payloads that have not been identified as a threat.

11. The computer system of claim 8, further comprising:
program instructions to identify data compliance violations, based on installed single or multi firmware privacy policies, a situation of a physical device; and
program instructions to determine, based on an identified situation of the physical device, whether data compliance violations are present in the identified physical device situation, wherein the data compliance violations are data containing personal or sensitive personal information thereby enabling complete, partial or no authorization of data exchange from dynamic twin payload interactions.

12. The computer system of claim 8, wherein the security information and information privacy control attribute profiles dictate the level of security and privacy attributes that will accompany the geofencing policy.

13. The computer system of claim 12, further comprising:
program instructions to generate insights, classifying physical device incidents, and implements enhanced policy models for predicting the event to be the policy breach based on the generated knowledge corpus.

14. The computer system of claim 8, further comprising:
program instructions to display, by a user interface, a responsive prompt to a user, where the responsive prompt is a response prompt that notifies the user of a status of a digital twin payload and prompts the user to confirm a predetermined action based on an identified status of the digital twin payload; and program instructions to rank and output notifications and status updates, based on hierarchy and filter data, for a geofenced digital twin and a plurality of geofenced twins involved in a geospatial region based on the privacy and security policies and hierarchy of the geofence, wherein the privacy and security policies and hierarchy of the geofence are predetermined.

15. A computer program product for data governance and security of digital assets, the computer program product comprising:
one or more computer readable storage devices and program instructions stored on the one or more computer readable storage devices, the stored program instructions comprising:

responsive to triggering two or more overlapping digital twins, program instructions to enable a hierarchical designation of the two or more digital twins, wherein responsive to a second digital twin being active, the second digital twin takes precedence over a first digital twin;

program instructions to apply, based on blockchain based smart contracts, privacy and security policies for a participating heterogeneous digital twin enclosed within predetermined boundaries of a geofence, and applying multiple or multi-level geofences consisting of one or more heterogeneous privacy policies to one or more geospatial regions;

program instructions to apply, based on hierarchical designation of geofences and a participating digital twin from the two or more overlapping digital twins that comprises overlapping geofenced digital twin ecosystems, hierarchical privacy and security policies to geofences associated with the participating digital twin;

program instructions to dynamically generate computational and deployment policies based on the applied hierarchical privacy and security policies of the geofenced digital twin;

program instructions to create dynamic test automation workflows for enhanced security and privacy testing that enumerate security, privacy vulnerabilities or high-risk geospatial areas;

program instructions to generate a knowledge corpus comprising information security and information privacy control attribute profiles for the geofence and components of the geofence; and program instructions to implement enhanced policy models for predicting an event to be a policy breach based on the generated knowledge corpus.

16. The computer program product of claim 15, further comprising:
program instructions to enable, through smart contracts, confidential, integral, secure, governed and provenanced data exchange between the interacting digital twins for multifarious twin dependencies like operational, status, procedural, simulation and predictive and integrity of a physical devices corresponding to the discrete or composite digital twins.

17. The computer program product of claim 15, further comprising:
program instructions to monitor, through smart contract-based twin management framework, digital twin payloads entering or leaving the geofenced area;
program instructions to determine the monitored digital twin payloads entering or leaving the geofenced area are not tampered with or compromised; and program instructions to authenticate the digital twin payloads that have not been identified as a threat.

18. The computer program product of claim 15, further comprising:
program instructions to identify data compliance violations, based on installed single or multi firmware privacy policies, a situation of a physical device; and
program instructions to determine, based on an identified situation of the physical device, whether data compliance violations are present in the identified physical device situation, wherein the data compliance violations are data containing personal or sensitive personal information thereby enabling complete, partial or no authorization of data exchange from dynamic twin payload interactions.

19. The computer program product of claim 15, further comprising:
program instructions to generate insights, classifying physical device incidents, and implements enhanced policy models for predicting the event to be the policy breach based on the generated knowledge corpus.

20. The computer program product of claim 15, further comprising:
program instructions to display, by a user interface, a responsive prompt to a user, where the responsive prompt is a response prompt that notifies the user of a status of a digital twin payload and prompts the user to confirm a predetermined action based on an identified status of the digital twin payload; and
program instructions to rank and output notifications and status updates, based on hierarchy and filter data, for a geofenced digital twin and a plurality of geofenced twins involved in a geospatial region based on the privacy and security policies and hierarchy of the geofence, wherein the privacy and security policies and hierarchy of the geofence are predetermined.

* * * * *